(12) United States Patent
Corbett, Jr.

(10) Patent No.: US 7,392,989 B2
(45) Date of Patent: Jul. 1, 2008

(54) CONNECTOR GASKET FOR CONCRETE STRUCTURES

(75) Inventor: Bradford G. Corbett, Jr., Ft. Worth, TX (US)

(73) Assignee: S & B Technical Products, Inc., Fort Worth, TX (US)

(*) Notice: Subject to any disclaimer, the term of this patent is extended or adjusted under 35 U.S.C. 154(b) by 149 days.

(21) Appl. No.: 11/220,052

(22) Filed: Sep. 6, 2005

(65) Prior Publication Data

US 2006/0082141 A1    Apr. 20, 2006

Related U.S. Application Data

(60) Provisional application No. 60/607,616, filed on Sep. 7, 2004.

(51) Int. Cl.
*F16L 5/02* (2006.01)
*F16L 49/00* (2006.01)

(52) U.S. Cl. .......................... 277/606; 405/36; 285/230
(58) Field of Classification Search ................ 285/230, 285/231; 405/23; 277/606, 607, 618
See application file for complete search history.

(56) References Cited

U.S. PATENT DOCUMENTS

| 3,866,925 | A | * | 2/1975 | Maimstrom et al. | ......... 277/618 |
| 4,215,868 | A | * | 8/1980 | Skinner et al. | ............... 277/314 |
| 4,614,371 | A | * | 9/1986 | Bauder | ........................ 285/231 |
| 4,693,482 | A | * | 9/1987 | Daigle et al. | ................ 277/606 |
| 6,457,725 | B1 | * | 10/2002 | Jones | .......................... 277/606 |
| 6,481,927 | B2 | * | 11/2002 | Rhodes | ........................ 405/36 |
| 6,669,405 | B1 | * | 12/2003 | Rhodes | ........................ 405/36 |

* cited by examiner

*Primary Examiner*—Tara L. Mayo
(74) *Attorney, Agent, or Firm*—Charles D. Gunter, Jr.

(57) ABSTRACT

A manhole assembly for a manhole having generally cylindrical sidewalls defined between an outside surface and an inside surface separated by a wall thickness and having a wall opening communicating the outside and inside sidewall surfaces of the manhole for insertion of a mating pipe. The wall opening defines a peripheral surface relatively perpendicular to the outside and inside sidewall surfaces which receives a ring shaped elastomeric gasket. The gasket has a retaining ring whose location is precisely determined to allow the gasket to be obliquely inserted within the wall opening of the manhole and to be subsequently snap-fitted into position on the peripheral surface, whereby the gasket is securely retained in a locked-in position with respect to the wall opening in the sidewall of the manhole.

5 Claims, 3 Drawing Sheets

CONNECTOR GASKET FOR CONCRETE STRUCTURES

CROSS-REFERENCE TO RELATED APPLICATION

The present application claims priority from earlier filed provisional application Ser. No. 60/607,616, filed Sep. 7, 2004, entitled "Connector Gaskets for Concrete Structures," by Bradford G. Corbett, Jr.

BACKGROUND OF THE INVENTION

1. Field of the Invention

The present invention relates generally to the installation of sanitary sewers and more specifically, to the problem of tightly sealing a manhole against inflow or outflow of liquid at the point where a sewer pipe passes through its walls and still more specifically to elastomeric gaskets for resiliently supporting and sealing the space between a pipe and the surrounding surface of an opening in the manhole through which the pipe passes.

2. Description of the Related Art

Pipes are commonly used for the conveyance of fluids in a variety of municipal applications, including their use as free-flowing conduits running partly full, as in drains and sewers. Pipes used in these type applications have been made of steel, cast iron, concrete, vitrified clay, and most recently, plastic including the various polyolefins and PVC.

In sewer lines, manholes are ordinarily installed at various intervals including locations where the sewer line changes elevation or direction. Manholes are typically formed in molds from a settable material such as concrete. The mold may form one or more annular openings in the manhole in which sewer pipes are positioned to lie adjacent a wall of the manhole defining that particular opening. The joint between the manhole wall and outer surface of the sewer pipe is sealed to prevent ground water from entering the manhole and to prevent contents of the manhole, such as sewage and water, from leaking out of the manhole. When ground water enters the manhole, it often brings in sediment which collects in the sewer over time. Such sediment causes clogs and inhibits the ability of the manhole to carry water. In addition, infiltration of ground water also increases the total volume of sewage flow through sewer lines which increases the required size of pipe needed as well as the expense of treatment of the total sewage flow. When the contents of the manhole leak, they can pollute the ground water.

Various types of gaskets for sealing joints between pipes and manholes are known. Often these gaskets are formed from an elastomeric material that is either inserted in an opening in the manhole and expanded via a ring or physically embedded in a portion of a wall adjacent the opening in the manhole. It is generally necessary to either physically embed the gasket in the concrete wall of the manhole or to use some type of physical expansion mechanism in order to insure that the gasket is properly retained in the desired position as the mating male pipe end is inserted into the manhole opening.

Expanded gaskets require rings that exert an outwardly, radially directed force on an inner surface of a gasket positioned within the opening to compress the gasket against a manhole wall defining the opening. These rings increase both material and labor installation costs associated with sealing the joint between the manhole wall and pipe. Material costs are increased because these rings are somewhat complicated corrosion-resistant metal structures that must be manually fabricated or are molded plastic structures that are made, at least in part, from high strength, expensive compositions. Labor costs are increased because installation and expansion of such rings to effect a seal requires maintaining proper alignment of the ring and use of equipment such as mechanical expansion units. In addition, seal failure will occur if the rings are improperly installed.

Embedded gaskets solve many of the problems associated with the manufacture and installation of expansion gaskets. Embedded gaskets also allow a larger diameter of pipe to be inserted into an opening in a manhole than expanded gaskets because a separate ring is unnecessary. As is known, outside pipe diameter size can increase up to a certain point at which an expanded gasket can no longer be used for a particular sized manhole because the width of a wall defining an opening in the manhole will no longer be large enough to support the expansion ring. This means that a next, larger sized, more expensive manhole must be used for the larger diameter pipe. However, embedded gaskets must be set in the wall of the manhole defining the opening for the mating male pipe. One of the problems with embedded gaskets is that they can, on occasion, roll and shift as the pipe is being inserted. It is critical, during the installation process, that the gasket not be able to twist or flip since a displaced or dislocated gasket will adversely affect the ultimate sealing capacity of the joint. Irrespective of the type of sealing action of the sealing element, such as compression sealing action, lip sealing action or a combination thereof, it is necessary that the sealing gasket consists of a relatively soft elastomeric material. However, a sealing ring which is formed entirely of a material which is sufficiently soft and elastomeric to provide the sealing function has the disadvantage that it is difficult to retain in the desired position. There is also the risk that such a sealing ring will be displaced from its sealing position if the difference of the internal or external pressures on either side of the sealing ring are sufficiently great. In addition, the rolling and shifting of the embedded gasket can weaken the actual manhole material itself and in turn adversely affect the ultimate sealing capacity of the joint.

What is needed is a gasket design which achieves the advantages of the embedded gasket but which will not tend to roll and shift as the pipe is being inserted within a manhole opening or be displaced from its sealing position due to a difference of internal or external pressure.

Also needed is such an improved gasket design which achieves these performance results without the need for external expansion rings or separate components to achieve ring expansion.

SUMMARY OF THE INVENTION

It is an object of the present invention to provide an integrated manhole connection including a sealing gasket that will not tend to roll and shift as a mating pipe is being inserted within an opening in the manhole.

It is another object of the present invention to provide an improved gasket that will not be displaced from its sealing position due to a difference of internal or external pressures on either side of the sealing connection.

The above objects are achieved by providing an improved manhole connection for a precast manhole having a wall thickness and a wall opening defining a peripheral surface which is perpendicular to the external sidewalls of the manhole. A ring shaped elastomeric body is received within the wall opening in snap-fit fashion. The ring shaped elastomeric body carries at least one relatively rigid ring which circumscribes the gasket body. The location of the ring is precisely determined to allow the gasket to be obliquely inserted within the wall opening of the manhole and to be subsequently snap-fitted into position, whereby the gasket is securely retained in a locked-in position with respect to the wall opening in the sidewall of the manhole. If only one rigid ring is present, it is generally embedded in the material of the elastomeric gasket body and is snap-fit within a mating groove provided in the wall opening. Where more than one rigid ring is present, the rings may straddle the wall opening in the sidewall of the manhole opening. A third ring may also be present to more securely engage an external surface of the mating male pipe being inserted into the wall opening of the manhole.

Additional objects, features and advantages will be apparent in the written description which follows

DETAILED DESCRIPTION OF THE PREFERRED EMBODIMENT

Figure 1:
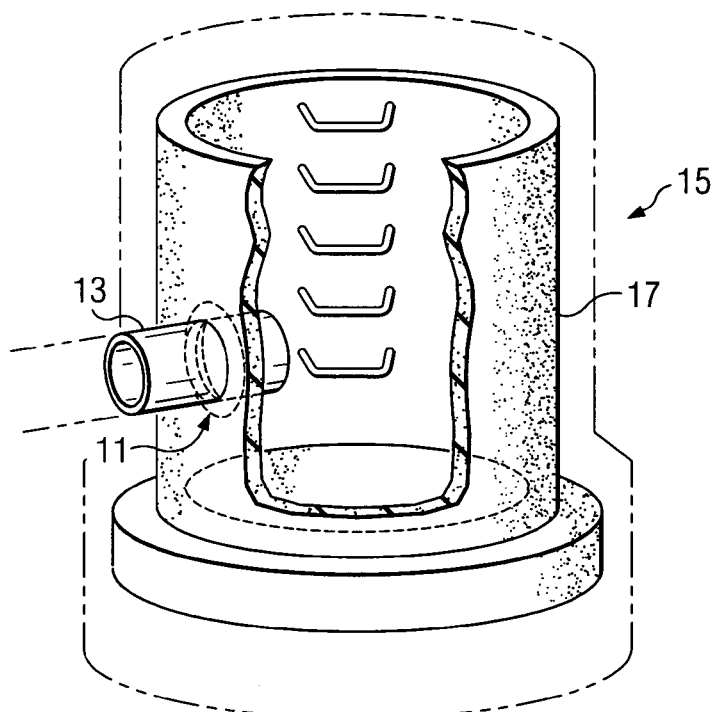
FIG. 1 is a perspective view of a manhole with parts broken away and showing a mating pipe used to form a manhole connection.
Figure 1A:
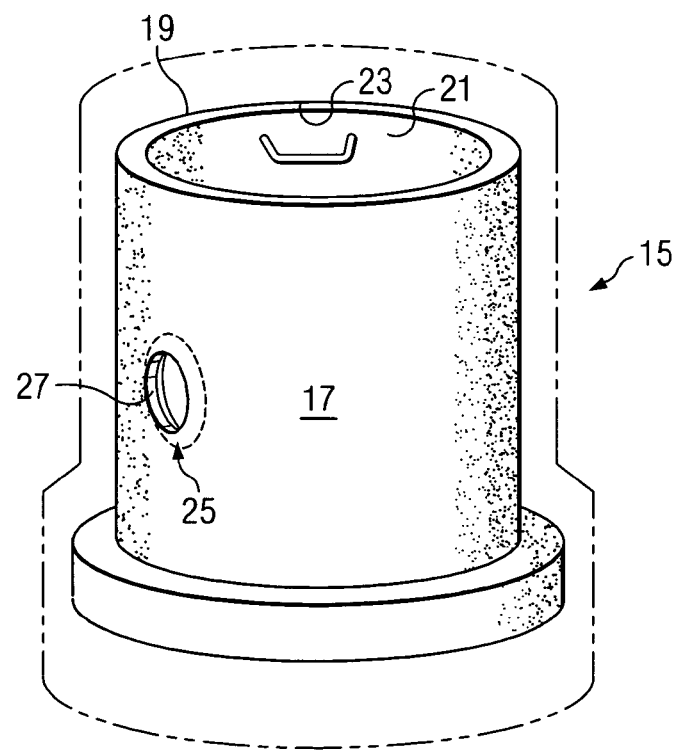
FIG. 1A is a perspective view similar to FIG. 1 but with the mating pipe removed to better illustrate the manhole opening.

Turning to FIGS. 1 and 1A, there is shown a manhole connection, designated generally as 11, provided for connecting a sewer pipe or insertion pipe 13 to a manhole 15. The manhole 15 is formed of a cast, settable material. Preferably, the manhole 15 is made of concrete but may be made of vitrified clay or other similar castable materials and is generally cylindrical in shape and typically about 3-5 feet in diameter and about 3 feet high. Generally the manhole 15 is sufficiently large enough to accommodate a person working therein.

The manhole 15 has generally symmetrical, cylindrical sidewalls 17 defined by an outside surface 19 and an inside surface 21 separated by a wall thickness 23. The wall thickness 23 can vary but is generally less than about 12 inches. An opening 25 in the manhole sidewall 17 is provided that communicates the outside surface 19 and inside surface 21 of the manhole 15 for insertion of the mating pipe 13. The opening 25 is bounded by a peripheral surface 27 which is generally perpendicular to the outside surface 110 of the sidewalls 17 of the manhole 104. The peripheral surface 27 has a thickness which is typically the same thickness as that of the sidewall 17 but can be less than the entire wall thickness which, in this case, is about 12 inches.

A ring shaped elastomeric body gasket body (29 in FIGS. 2-3A) is provided in order to form a fluid seal between the pipe 13 and the opening 25 in the manhole sidewall 17 in order to prevent water or sewage charged into the manhole 15 from leaking outwardly past the pipe 13 and to prevent ground water from leaking into the inside of the manhole 15. Also, the elastomeric gasket body 29 is provided in order to afford a small degree of freedom of movement between the pipe 13 and the manhole 15 to compensate for misalignment which occurs during installation or to accommodate subsequent shifting of the supporting soil for the manhole 15 and pipe 13.

The elastomeric gasket 29 is received in snap-fit fashion within a mating groove 31 which is cast in the sidewall opening 25 so that the gasket presents an exposed sealing face on the peripheral surface 27. Generally, the elastomeric gasket 29 will thick enough to cover about half of the exposed area of the peripheral surface 27. However, various thicknesses of the elastomeric gasket 29 are suitable so long as a good relatively secure seal is provided between the pipe 13 and the manhole sidewall opening 25. The elastomeric gasket body has a substantially homogeneous composition and may be made of an elastomeric material such as neoprene, isoprene, or a combination thereof, natural gum rubber, or other rubber-like material resilient in nature. A 55 Durometer natural or synthetic rubber such as a "SBR" commercial grade rubber provides a suitable deformability of the elastomeric gasket body 29, for example.

Figure 2:
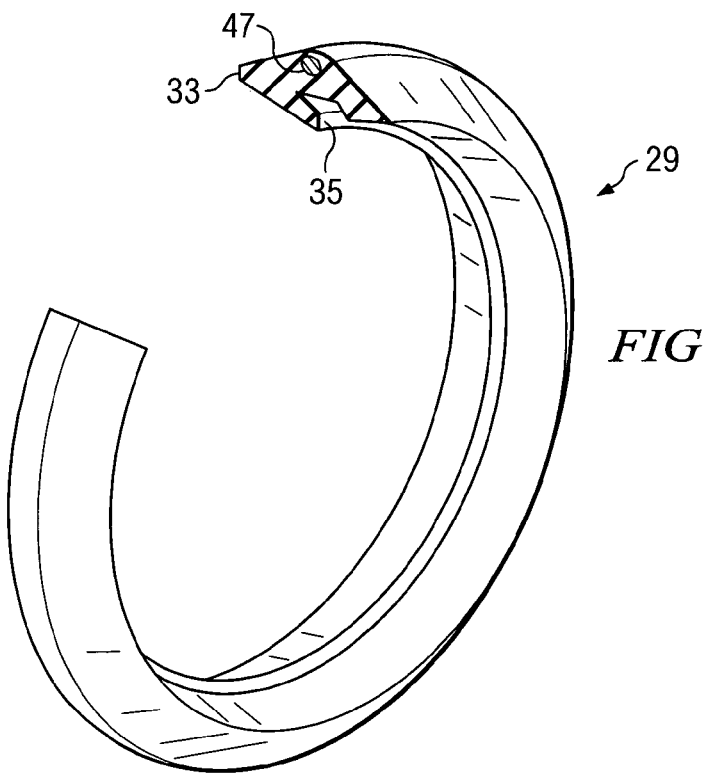
FIG. 2 is an isolated view of one version of the sealing gasket used in the manhole connection of the invention.
Figure 3:
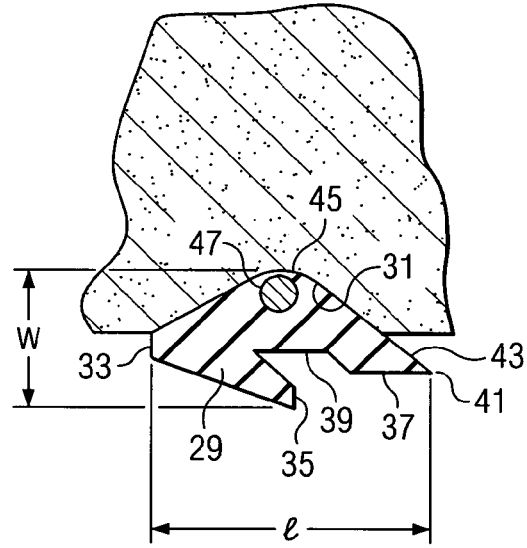
FIG. 3 is an isolated, cross sectional view of the sealing gasket of FIG. 2 being received in snap-fit fashion within a mating groove provided in the wall thickness of the manhole opening.
Figure 3A:
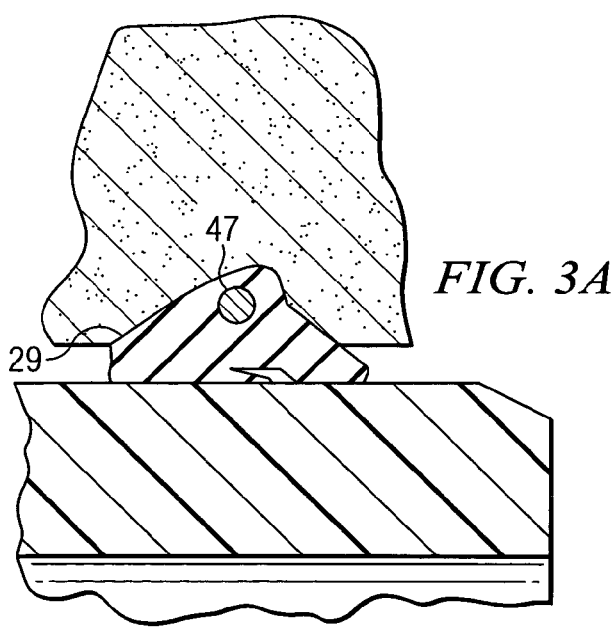
FIG. 3A is a view similar to FIG. 3 but showing a mating pipe used to form a sealed manhole connection.

The geometry of the elastomeric gasket body 29 can best be appreciated with respect to the cross sectional views presented in FIGS. 2, 3 and 3A of the drawings. The elastomeric gasket body 29 has a leading nose region 33 which is joined to a radially inwardly slanting primary sealing surface 35 which forms a lip seal for engaging an exterior surface of the pipe 13 during insertion. The primary sealing surface 35 is joined to a secondary sealing surface 37 by an intermediate circumferential groove region 39. The secondary sealing surface 37 comprises a planar circumferential region which terminates in an inside corner 41 of the elastomeric body 29.

The external gasket surface 43 begins as a uniformly sloping surface at the inside corner 41. After reaching an apex region 45, the sloping surface continues downwardly to rejoin the leading nose region 33.

As shown in FIG. 3, the body of the elastomeric gasket 29 has a length defined between the nose region 33 and the inside corner 41 thereof and has an overall width defined between the outermost wall region apex or pitch point 45 and the lip region innermost extent (generally at 35 in FIG. 3). The overall length is illustrated as "1" in FIG. 3. The overall width is illustrated as "w" in FIG. 3.

A reinforcing element, such as a metal ring 47, passes through the ring shaped elastomeric body 29 at one circumferential location such that when viewed in cross section appears below the peripheral surface 27 of the wall opening 25, as seen in FIGS. 3 and 3A.

By providing a metal ring 47 below the peripheral surface 27, the elastomeric body 29 is made resistant to deformation so that the elastomeric body 29 as a whole is securely maintained on the peripheral surface 27 during the installation of the mating pipe 13. Also, the metal ring 47 helps to retain the elastomeric body 29 in position and insure the elastomeric body 29 is not dislodged or displaced during storage, transportation or field installation once the formation of the manhole 15 is completed. Because the metal ring 47 is embedded within the elastomeric body 29, it is entirely isolated from the external environment including water, sewage or other fluids flowing through the pipe joint. As such, the metal ring 47 is not subject to corrosion or deterioration by contact with liquids.

Because the relatively rigid ring 47 is located below the level of the peripheral surface 27, as viewed in FIG. 3, it is necessary to cant and flex the gasket body during the installation process. It is also necessary that the ring location be determined that will allow the gasket to be installed within the groove 31, but which will also be securely retained in its location once the installation operation is complete. Various techniques may be utilized to cant and flex the gasket body so that the larger diameter ring will fit within the relatively smaller diameter wall opening into the sidewalls of the manhole. One device for installing a gasket by canting and flexing the gasket is shown in U.S. Pat. No. 6,044,539, issued Apr. 4, 2000, and assigned to the assignee of the present invention. While the device is used in that case to install a gasket into a mating groove received in the bell end opening of a plastic pipe, such a device could be adapted for use in the present installation.

Figure 4:
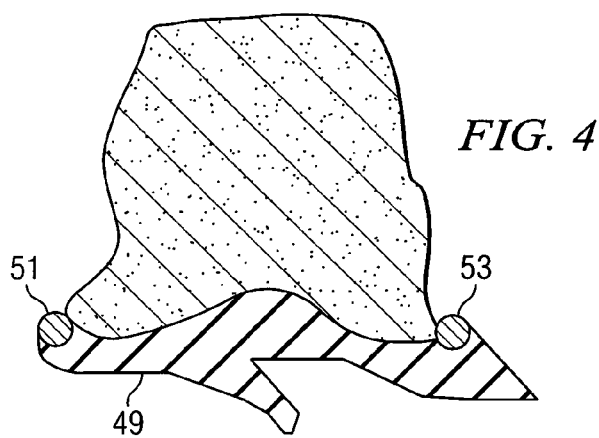
FIG. 4 is an isolated, cross sectional view, similar to FIG. 3, but showing another version of the sealing gasket of the invention, in this case having two rigid rings which straddle the wall opening in the manhole.
Figure 4A:
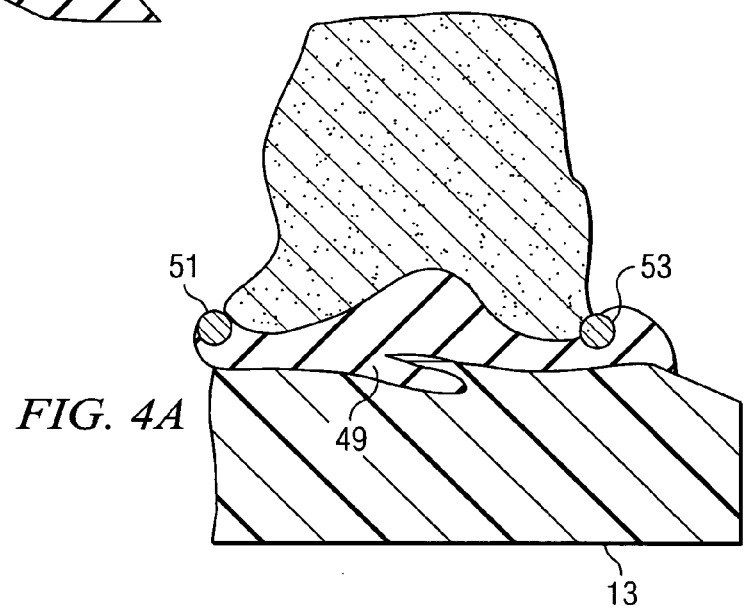
FIG. 4A is a view similar to FIG. 4, but showing a mating pipe used to form a sealed manhole connection.

While FIGS. 2, 3 and 3A illustrate one possible embodiment of the gasket of the invention, it is also possible that the gasket will assume a variety of different shapes. For example, FIGS. 4 and 4A illustrate another embodiment of the gasket of the invention in which the gasket body 49 includes a pair of retaining rings 51, 53 which straddle the sidewall opening 25 in the manhole. In this case, the peripheral surface (27 in FIG. 1A) may or may not be provided with a mating groove. The retaining rings 51, 53 may be sufficient for retaining the gasket body in position on the peripheral surface 27. Again, the ring location of the rings 51, 53 is below the level of the mouth opening, as viewed in the cross section of FIGS. 4 and 4A. As a result, it is necessary to bend and flex at least one of the rings in order to achieve the placement of the gasket body, as viewed in FIG. 4A.

Figure 5:
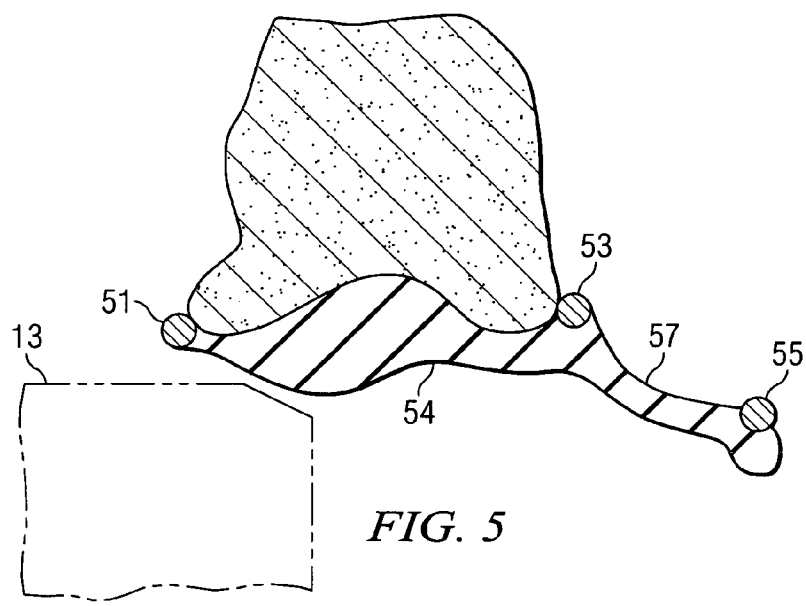
FIG. 5 is a view similar to FIG. 4, but showing another version of the gasket of the invention in which a third rigid ring is used to form a more secure seal with an external surface of the mating male pipe, a portion of the male pipe being shown in phantom lines.

FIG. 5 illustrates another version of the gasket of the invention in which the gasket body 54 includes a third relatively rigid ring 55 located proximate the outer lip of a trailing portion 57 of the gasket body. The trailing portion and additional relatively rigid ring 55 assist in engaging an exterior surface of the mating male pipe 13.

In each of the above cases, the placement of the relatively rigid rings in association with the gasket body is precisely determined to allow the gasket to be obliquely inserted within the wall opening of the manhole and to be subsequently snap-fitted into position, whereby the gasket is securely retained in a locked-in position with respect to the wall opening in the sidewall of the manhole.

An invention has been provided with several advantages. The sealing gasket used in the manhole connection of the invention will not tend to roll and shift as a mating pipe is being inserted within an opening in the manhole. Additionally, the sealing gasket will not be displaced from its sealing position due to a difference of internal or external pressures on either side of the sealing connection. By providing a metal ring below the gasket peripheral surface, the elastomeric body of the gasket is made resistant to deformation so that the elastomeric body as a whole is securely maintained on the peripheral surface of the concrete manhole opening during the installation of the mating pipe. Also, the metal ring helps to retain the elastomeric body in position and insure the elastomeric body is not dislodged or displaced during storage, transportation or field installation. This combination of structural features insures that the elastomeric body is resistant to deformation so that the elastomeric body as a whole is securely maintained on the peripheral surface of the manhole opening during the installation and subsequent use.

While the invention has been shown in several of its forms, it is not thus limited but is susceptible to various changes and modifications without departing from the spirit thereof.

What is claimed is:

1. A manhole assembly, comprising:
    a manhole having generally cylindrical sidewalls, the sidewalls being defined between an outside surface and an inside surface separated by a wall thickness;
    a wall opening communicating the outside and inside sidewall surfaces of the manhole for insertion of a mating pipe;
    the wall opening defining a peripheral surface relatively perpendicular to the outside and inside sidewall surfaces;
    a ring shaped elastomeric gasket having a body formed of rubber, retained in position on the peripheral surface of the wall opening in the manhole, the ring shaped elastomeric gasket having a substantially homogeneous composition and having a pair of relatively rigid retaining rings embedded within the rubber of the gasket body which circumscribe the ring shaped elastomeric gasket at a circumferential location, the location of the rings being precisely determined to allow the gasket to be obliquely inserted within the wall opening of the manhole and to be subsequently snap-fitted into position on the peripheral surface, whereby the gasket is securely retained in a locked-in position with respect to the wall opening in the sidewall of the manhole;
    wherein when the peripheral surface of the manhole is viewed in cross section, the location of the retaining rings appear below the peripheral surface of the wall opening once the gasket is in place, whereby the relatively rigid retaining rings serve to more securely anchor the gasket within the manhole wall opening and thereby make the gasket more resistant to deformation during installation of the mating pipe within the wall opening; and
    wherein the pair of embedded rings straddle the sidewall opening in the manhole.

2. The assembly of claim 1, wherein the manhole is formed of cast concrete.

3. The assembly of claim 2, wherein the relatively rigid retaining ring is formed of a material selected from the group consisting of metals, metal alloys, rigid plastics and composites.

4. A method of forming a manhole connection for a concrete manhole, the method comprising the steps of:
    positioning a ring shaped elastomeric gasket having a body formed of rubber, on a peripheral surface of a sidewall opening of the manhole, the gasket having a body of a substantially homogeneous composition and having a pair of relatively rigid retaining rings embedded within the rubber of the gasket body which circumscribe the ring shaped elastomeric body at a circumferential location which, when viewed in cross section, appears below the peripheral surface of the wall opening once the gasket is in place, whereby the relatively rigid retaining rings serve to more securely anchor the gasket within the manhole wall opening and thereby make the gasket more resistant to deformation during installation of the mating pipe within the wall opening;
    wherein the ring shaped elastomeric gasket body is obliquely inserted into the wall opening by bending and flexing the gasket body and associated retaining rings at an oblique angle with respect to the peripheral surface of the sidewall opening, followed by inserting the gasket into the wall opening, followed by allowing the gasket to return to an unflexed state so that the embedded rings are below the level of the peripheral surface of the wall opening; and
    wherein the pair of embedded rings straddle the sidewall opening in the manhole.

5. The method of claim 4, wherein the relatively rigid retaining ring is formed of a material selected from the group consisting of metals, metal alloys, rigid plastics and composites.

\* \* \* \* \*